United States Patent [19]

Finkelmann et al.

[11] Patent Number: 5,151,481
[45] Date of Patent: Sep. 29, 1992

[54] POLYMERS HAVING LIQUID CRYSTAL PHASES CONTAINING 2-CYANOACRYLIC ACID ESTER GROUP

[75] Inventors: Heino Finkelmann; Bernfried Messner, both of Freiburg, Fed. Rep. of Germany

[73] Assignee: Merck Patent Gesellschaft Mit Beschraenkter Haftung, Darmstadt, Fed. Rep. of Germany

[21] Appl. No.: 399,973

[22] Filed: Aug. 29, 1989

[30] Foreign Application Priority Data

Aug. 30, 1988 [DE] Fed. Rep. of Germany ....... 3829375

[51] Int. Cl.$^5$ ...................... C08F 22/32; C08F 122/32
[52] U.S. Cl. .................................. 526/298; 526/310; 526/312; 525/295; 252/299.01
[58] Field of Search ....................... 526/298, 310, 312; 525/295; 252/299.01

[56] References Cited

U.S. PATENT DOCUMENTS 4,882,402  11/1989  Leslie et al. ................. 526/298

Primary Examiner—Kriellion S. Morgan
Assistant Examiner—Tae H. Yoon
Attorney, Agent, or Firm—Millen, White & Zelano

[57] ABSTRACT

The invention relates to polymer materials which contain liquid crystal phases and have mesogenic groups which are bonded chemically directly or via a spacer and contain a 2-cyanoacrylic acid ester unit.

8 Claims, No Drawings

POLYMERS HAVING LIQUID CRYSTAL PHASES CONTAINING 2-CYANOACRYLIC ACID ESTER GROUP

SUMMARY OF THE INVENTION

The invention relates to polymer materials which contain liquid crystal phases and have mesogenic groups which are chemically bonded directly or via a spacer and contain a 2-cyanoacrylic acid ester unit.

A number of liquid-crystal, side-chain polymers are already known. Thus, for example, DE-OS 29 44 591 and EP-PS 0,060,335 describe organopolysiloxanes and DE-OS 28 31 909 and Springer and Weigelt, Makromol. Chem. 194 (1983) 1489, describe polymethacrylates having mesogenic side groups.

Polyacrylic and polymethacrylic acid esters modified with 4'-cyanobiphenyl-4-yl as a mesogenic group are also known, for example. Nematic phases of such polymer compositions usually lie at temperatures above 100° C. Such materials frequently also exhibit crystalline behaviour, associated with the lack of mesomorphic properties.

The object of the present invention was to discover polymer materials which contain liquid crystal phases and have the disadvantages described to only a minor degree, if at all.

It has now been found that polymer materials which contain chemically bonded mesogenic groups having at least one 2-cyanoacrylic acid ester unit have surprisingly wide mesophase ranges, a birefringence which can be varied within wide limits and a negative dielectric anisotropy. They are moreover easy to process into articles of any desired shape having anisotropic properties and have a high chemical stability. Such polymers furthermore form, inter alia, $S_c$ and $S_{c^*}$ phases.

The invention relates to polymer compositions which contain liquid crystal phases and mesogenic groups which are bonded directly or via a spacer, characterized in that at least one of the mesogenic groups contains a structural element of the formula I (a 2-cyanoacrylic acid ester unit)

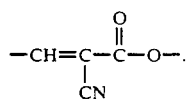   I

The invention also relates to polymer compositions which contain liquid crystal phases and are defined according to claim 1, wherein the mesogenic groups correspond to the formula II $R^1—(A^1—Z)_n—A^2—Sp—$   II wherein
$R^1$ is H or an alkyl group having up to 15 C atoms, wherein one or more $CH_2$ groups can also be replaced by a grouping from the group comprising —CH=CCN—CO—O—, —O—, —S—, —O—CO—O—, —CO—, —CO—O—, —O—CO—, —CRR'—T—, —CO—S—, —S—CO—, —CH=CH—(trans), —C(halogen)$_2$—, —SO— and —SO$_2$—, 2 heteroatoms not being linked with one another, or halogen, CN or —NCS,
$A^1$ and $A^2$ each independently of one another are a
a) 1,4-cyclohexylene radical, wherein one or two non-adjacent $CH_2$ groups can also be replaced by —O— and/or —S— atoms and/or a $CH_2$ group can also be replaced by —CO—,
b) 1,4-phenylene radical, wherein one or more CH groups can also be replaced by N, or
c) 1,4-bicyclo(2.2.2)octylene or piperidine-1,4-diyl radical,
   it being possible for the radicals a) and b) to be monosubstituted or polysubstituted by halogen atoms and/or CN and/or $CH_3$ and/or $NO_2$ groups,
n is 1, 2 or 3,
Z is in each case —CH=CCN—CO—O—, —CO—O—, —O—CO—, —CH$_2$CH$_2$—, —CRR'—T—, —CH$_2$—CO—, —CO—CH$_2$—, —CHCN—CH$_2$—, —CH$_2$CHCN—, —CH=CH—, —OCH$_2$—, —CH$_2$—O—, —C≡C—, —CH=CNO$_2$—, —CHNO$_2$ or a single bond,
Sp is alkylene having 2–18 C atoms, wherein one or two non-adjacent $CH_2$ groups can also be replaced by —CH=CCN—CO—O—, —O—, —CO—, —O—CO—, —CO—O—, —C(halogen)$_2$—, —CRR'—T—, —CH=CNO$_2$, —CHNO$_2$—, —CHCN— or —CH=CH—, or a single bond,
T is —COO—, —OCO— or a single bond,
R is H or an alkyl group having up to 6 C atoms and
R' is halogen or CN
with the proviso that at least one structural element of the formula I according to claim 1 is present.

The invention furthermore relates to a process for the preparation of such polymer compositions, in which compounds of the formula III

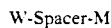   III wherein M is a mesogenic group containing at least one 2-cyanoacrylic acid ester structural element of the formula I and W denotes a functional group capable of polymerization or grafting, are polymerized or grafted onto polymers, and to the use of such polymer compositions as organic substrates in electronics for the fibre and film industry.

Above and below, R, T, $R^1$, $A^1$, Z, n, $A^2$, Sp, R', W and M have the meaning given, unless expressly noted otherwise.

The structural element of the formula I, at least one of which is present in a mesogenic group, corresponds to a 3-substituted 2-cyanoacrylic acid ester unit

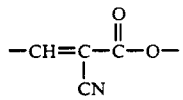   I which can be present either in the wing group, in the bridge Z or in the spacer of the mesogenic groups. The structural element of the formula I is preferably a bridge between two rings. The mesogenic groups preferably contain only one structural element of the formula I.

The mesogenic groups containing the structural element of the formula I preferably correspond to the formula II.

The compounds of the formula II include compounds with two rings of the part formulae IIa to IIb, with three rings of the part formulae IIc to IIf and with four rings of the part formulae IIg to IIn:

$R^1—A^1—Z—A^2—Sp—$   IIa

-continued

| | |
|---|---|
| $R^1-A^1-A^2-Sp-$ | IIb |
| $R^1-A^1-Z-A^1-Z-A^2-Sp-$ | IIc |
| $R^1-A^1-A^1-A^2-Sp-$ | IId |
| $R^1-A^1-Z-A^1-A^2-Sp-$ | IIe |
| $R^1-A^1-A^1-Z-A^2-Sp-$ | IIf |
| $R^1-A^1-Z-A^1-Z-A^1-Z-A^2-Sp-$ | IIg |
| $R^1-A^1-Z-A^1-A^1-A^2-Sp-$ | IIh |
| $R^1-A^1-A^1-Z-A^1-A^2-Sp-$ | IIi |
| $R^1-A^1-A^1-A^1-Z-A^2-Sp-$ | IIj |
| $R^1-A^1-A^1-A^1-A^2-Sp-$ | IIk |
| $R^1-A^1-Z-A^1-Z-A^1-A^2-Sp-$ | IIl |
| $R^1-A^1-Z-A^1-A^1-Z-A^2-Sp-$ | IIm |
| $R^1-A^1-A^1-Z-A^1-Z-A^2-Sp-$ | IIn |

For simplicity, in the following Cyc is a 1,4-cyclohexylene group, wherein one or two non-adjacent $CH_2$ groups can also be replaced by O and/or S atoms, and Phe is a 1,4-phenylene group, wherein one or more, preferably one or two CH groups which also may be adjacent can also be replaced by N. These groups can also be substituted by one or more, preferably by one or two substituents from the group comprising halogen and/or CN and/or $NO_2$ and/or $CH_3$, halogen preferably being fluorine or chlorine. The cyclohexylene group can be in the cis-1,4- or trans-1,4-configuration. The trans-1,4-cyclohexylene group is preferred. Bco is a 1,4-bicyclo(2.2.2)octylene group and Pip is a piperidine-1,4-diyl group.

The proviso that the compounds of the formula II contain at least one structural element of the formula I applies.

Amongst the part formulae IIa to IIn, those of the formulae IIa, IIc, IIe, IIf, IIh, IIi and IIl are preferred. Compounds of the part formulae IIa, IIc, IIe and IIf are particularly preferred.

Examples of preferred compounds of the part formulae IIa and IIb are those of the formulae IIaa to IIap:

$R^1-Phe-Z-Phe-Sp-$     IIaa $R^1-Cyc-Z-Cyc-Sp-$     IIab $R^1-Cyc-Z-Phe-Sp-$     IIac $R^1-Phe-Z-Cyc-Sp-$     IIad $R^1-Bco-Z-Phe-Sp-$     IIae $R^1-Phe-O-\underset{\underset{O}{\|}}{C}-\underset{\underset{CN}{|}}{C}=CH-Phe-Sp-$     IIaf $R^1-Phe-CH=\underset{\underset{CN}{|}}{C}-\underset{\underset{O}{\|}}{C}-O-Phe-Sp-$     IIag $R^1-Phe-CH=\underset{\underset{CN}{|}}{C}-\underset{\underset{O}{\|}}{C}-O-Cyc-Sp-$     IIah $R^1-A^1-CH=\underset{\underset{CN}{|}}{C}-\underset{\underset{O}{\|}}{C}-O-A^2-Sp-$     IIai $R^1-A^1-O-\underset{\underset{O}{\|}}{C}-\underset{\underset{CN}{|}}{C}=CH-A^2-Sp-$     IIaj $R^1-Phe-COO-Phe-Sp-$     IIak $R^1-Phe-Phe-Sp-$     IIal $R^1-Cyc-COO-Phe-Sp-$     IIam $R^1-Cyc-Phe-Sp-$     IIan $R^1-Phe-CRR'-T-Phe-Sp-$     IIao $R^1-Cyc-Cyc-Sp-$     IIap Of these, those of the formulae IIaf, IIag, IIah, IIai, IIaj and IIal are particularly preferred. In the formulae IIak to IIap, the 2-cyanoacrylic acid ester group is contained in $R^1$ or in the spacer group.

Examples of preferred compounds of the part formula IIc are those of the formulae IIca to IIch:

$R^1-Phe-Z-Phe-O-\underset{\underset{O}{\|}}{C}-\underset{\underset{CN}{|}}{C}=CH-Phe-Sp-$     IIca $R^1-A^1-Z-A^1-O-\underset{\underset{O}{\|}}{C}-\underset{\underset{CN}{|}}{C}=CH-A^2-Sp-$     IIcb $R^1-A^1-Z-A^1-CH=\underset{\underset{CN}{|}}{C}-\underset{\underset{O}{\|}}{C}-O-A^2-Sp-$     IIcc $R^1-Cyc-Z-Phe-CH=\underset{\underset{CN}{|}}{C}-\underset{\underset{O}{\|}}{C}-O-Phe-Sp-$     IIcd $R^1-Phe-CH=\underset{\underset{CN}{|}}{C}-\underset{\underset{O}{\|}}{C}-O-Phe-Z-A^2-Sp-$     IIce $R^1-Phe-COO-Phe-Z-Phe-Sp-$     IIcf $R^1-Phe-CRR'T-Phe-CH_2CH_2-Phe-Sp-$     IIcg $R^1-Cyc-Z-Cyc-Z-Phe-Sp-$     IIch In the formulae IIcf to IIch, the 2-cyanoacrylic acid ester group is in $R^1$ or in the spacer.

Preferred compounds of the part formula IId include those of the formulae IIda to IIdg:

| | |
|---|---|
| $R^1-Phe-Phe-Phe-Sp-$ | IIda |
| $R^1-Cyc-Phe-Phe-Sp-$ | IIdb |
| $R^1-Cyc-Cyc-Phe-Sp-$ | IIdc |
| $R^1-Phe-Cyc-Cyc-Sp-$ | IIdd |
| $R^1-Phe-Cyc-Phe-Sp-$ | IIde |
| $R^1-Cyc-Cyc-Cyc-Sp-$ | IIdf |
| $R^1-Phe-Phe-Cyc-Sp-$ | IIdg |

In all the formulae IIda to IIdg, the 2-cyanoacrylic acid ester group is in $R^1$ or in the spacer group.

Preferred compounds of the part formulae IIe and IIf include those of the formulae IIea to IIem:

$R^1-Phe-CH=\underset{\underset{CN}{|}}{C}-\underset{\underset{O}{\|}}{C}-O-Phe-Phe-Sp-$     IIea $R^1-Phe-CH=\underset{\underset{CN}{|}}{C}-\underset{\underset{O}{\|}}{C}-O-Cyc-Phe-Sp-$     IIeb $R^1-Phe-CH=\underset{\underset{CN}{|}}{C}-\underset{\underset{O}{\|}}{C}-O-Phe-Cyc-Sp-$     IIec $R^1-Phe-O-\underset{\underset{O}{\|}}{C}-\underset{\underset{CN}{|}}{C}=CH-Phe-Phe-Sp-$     IIed

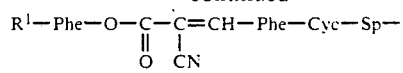 IIee

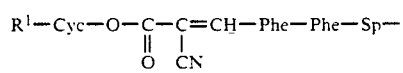 IIef

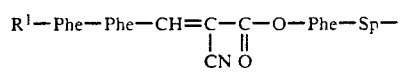 IIeg

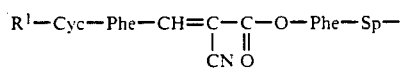 IIeh

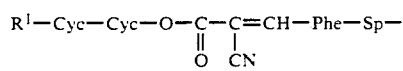 IIei

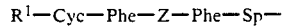 IIej

R$^1$—Phe—Phe—Z—Phe—Sp— IIek

 IIel

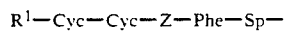 IIem

In the formulae IIej to IIem, the structural element of the formula I is in R$^1$ or in the spacer group.

Preferred compounds of the part formulae IIg to IIn include those of the formulae II1 to II9:

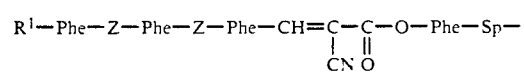 II1

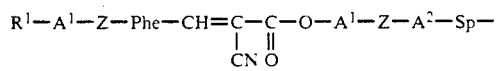 II2

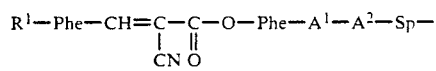 II3

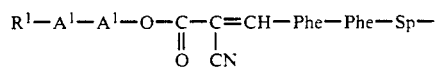 II4

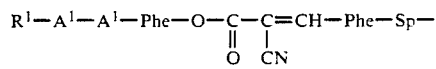 II5

R$^1$—A$^1$—A$^1$—Phe—Phe—Sp— II6

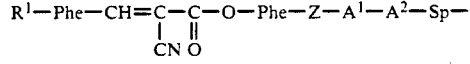 II7

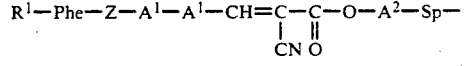 II8

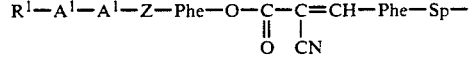 II9

In the part formula II6, the structural element of formula I is in R$^1$ or in —Sp—.

In the compounds of the formulae II above and below, R$^1$ is preferably alkyl or alkoxy.

Compounds which are furthermore preferred are those of the formulae and part formulae II above and below in which R$^1$ is an alkyl group, wherein one or more CH$_2$ groups, preferably one CH$_2$ group, is replaced, preferably by a —CO—, —CO—O—, —O—CO—, —CRR′—T— or —C(halogen)$_2$— group. Halogen is fluorine, chlorine or bromine, preferably F or Cl, and fluorine is particularly preferred. There is preferably —CO—O— or a single bond and R is preferably H or an unbranched alkyl group having up to 3 C atoms and is accordingly preferably methyl, ethyl or propyl, or furthermore also butyl, pentyl or hexyl. R′ is halogen or CN, preferably fluorine, chlorine or CN.

Compounds of the formula II wherein a CH$_2$ group in R$^1$ is replaced by the structural element of the formula I are also preferred. R$^1$ can preferably have the formula IV

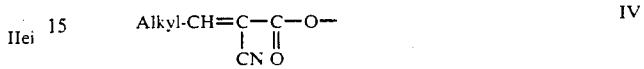 IV

A$^1$ and A$^2$ are each independently of one another preferably 1,4-cyclohexylene or 1,4-phenylene. They are furthermore preferably a pyridine-2,5-diyl, dioxane-2,5-diyl, pyrimidine-2,5-diyl or 1,4-bicyclo(2.2.2)octylene group.

n is preferably 1 or 2.

The radicals Z are in each case independently of one another preferably single bonds, —CO—O— or —O—CO—, or furthermore preferably —CRR′—T— or —CH$_2$CH$_2$—. R, R′ and T here have the preferred meanings given. Z is particularly preferably

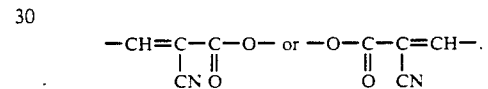

Sp preferably has the meaning of a straight-chain alkylene group having 2–10 C atoms and accordingly is preferably ethylene, propylene, butylene, pentylene, hexylene, heptylene, octylene, nonylene or decylene, or furthermore also undecylene, dodecylene, tridecylene, tetradecylene, pentadecylene, hexadecylene, heptadecylene or octadecylene. However, the alkylene groups can furthermore also be branched and accordingly are, for example, isopropylene, 1-methylpropylene, isobutylene, 2-methylbutylene, 3-methylbutylene or 2-methylpentylene. Alkylene groups which are furthermore preferred for Sp are those in which one or two non-adjacent CH$_2$ groups are replaced, preferably by —O—, —OCO—, —CO—O—, —CHHalogen— or —C(Halogen)$_2$—, furthermore preferably by —CRR′—T—, —CHNO$_2$— or —CH=CNO$_2$. Halogen, R, R′ and T here have the preferred meanings given.

Compounds of the formula II which are particularly preferred are those wherein a CH$_2$ group in Sp is replaced by the 2-cyanoacrylic acid ester unit

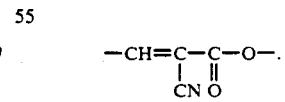

If R$^1$ is an alkyl or alkoxy radical, this can be straight-chain or branched. Preferably, it is straight-chain, has 2, 3, 4, 5, 6 or 7 C atoms and is accordingly preferably ethyl, propyl, butyl, pentyl, hexyl, heptyl, ethoxy, propoxy, butoxy, pentoxy, hexoxy or heptoxy, or furthermore methyl, octyl, nonyl, decyl, undecyl, dodecyl, tridecyl, tetradecyl, pentadecyl, methoxy, octoxy, nonoxy, decoxy, undecoxy, dodecoxy, tridecoxy or tetradecoxy.

Oxaalkyl is preferably straight-chain 2-oxapropyl (=methoxymethyl), 2- (=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-, 7-, 8- or 9-oxadecyl.

If $R^1$ is an alkyl radical in which a $CH_2$ group is replaced by —CH=CH—, this can be straight-chain or branched. Preferably, it is straight-chain and has 2 to 10 C atoms, and is accordingly, in particular, vinyl, prop-1- or prop-2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl or dec-1-, -2-, -3-, -4-, -5-, -6-, -7-, -8- or -9-enyl.

Compounds of the formula II with a branched wing group $R^1$ can occasionally be of importance because of a reduction in the tendency to crystallize, but in particular as chiral substituents of polymers, if they are optically active. Cholesteric polymers which can be used as thermochromic films or polymers with tilted smectic phases which have ferroelectric, piezoelectric, pyroelectric and/or non-linear optical properties of an even number order, in particular second order, are in this way obtained.

Branched groups of this type as a rule contain not more than one chain branch. Preferred branched radicals $R^1$ are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, 2-octyl, isopropoxy, 2-methylpropoxy, 2-methylbutoxy, 3-methylbutoxy, 2-methylpentoxy, 3-methylpentoxy, 2-ethylhexoxy, 1-methylhexoxy, 1-methylheptoxy (=2-octyloxy), 2-oxa-3-methylbutyl, 3-oxa-4-methylpentyl, 4-methylhexyl, 2-nonyl, 2-decyl, 2-dodecyl, 6-methyloctoxy, 6-methyloctanoyloxy, 5-methylheptyloxycarbonyl, 2-methylbutyryloxy, 3-methylvaleryloxy, 4-methylhexanoyloxy, 2-chloropropionyloxy, 2-chloro-3-methylbutyryloxy, 2-chloro-4-methylvaleryloxy, 2-chloro-3-methylvaleryloxy, 2-methyl-3-oxapentyl or 2-methyl-3-oxahexyl.

Formula II includes both the racemates of these compounds as well as the optical antipodes and mixtures thereof.

Amongst the compounds of the formula II and all the part formulae of II, those in which at least one of the radicals contained therein has one of the preferred meanings given are preferred.

The invention furthermore relates to a process for the preparation of polymer materials according to claim 1 and 2.

Thus, compounds of the formula III

W-Spacer-M    III wherein M is a mesogenic group having a structural element of the formula I and W is a functional group which is capable of polymerization or grafting, are polymerized or grafted onto polymers.

Polymerization here is to be understood both as free radical or ionic polymerization and as polyaddition or polycondensation.

If W contains a vinyl group, the compounds of the formula III can be polymerized by free radicals or ionically. The starting compounds can furthermore also be copolymerized with other olefinically unsaturated compounds. Grafting is also possible.

If W is a hydroxyl, amino, mercapto, epoxide or carboxyl group or one of its reactive derivatives, the compounds of the formula III can be grafted onto a polymer backbone.

The polymer materials according to the invention can also be prepared from the compounds of the formula III by copolymerization with other olefinically unsaturated monomers. Examples of suitable comonomers are $C_1$–$C_{20}$-alkyl esters of acrylic and/or methacrylic acid, styrene, α-methylstyrene, 4-methylstyrene, acrylonitrile, methacrylonitrile and methylene malonate.

If W in formula III is a vinyl group, the polymerization is carried out in a manner which is known per se by the action of radiation, thermal or electrical energy and by the action of free radical or ionic catalysts, such as is described, for example, in Ocian, Principles of Polymerization, McGraw-Hill, New York or the polymerization is carried out as group transfer polymerization using silylketene acetals as the initiator and Lewis bases as the co-initiator (for example described by O. W. Webster et al., J. Am. Chem. Soc. 1983, 105, 5706–5708).

UV-rays, laser beams, X-rays and radioactive rays are suitable as the radiation energy. Electrical energy can be generated, for example, by electrolysis processes. Examples of free radical catalysts are potassium persulfate, dibenzoyl peroxide, azobisisobutyronitrile, di-tert-butyl peroxide and cyclohexanone peroxide. Ionic catalysts are alkali metal-organic compounds, such as phenyllithium and naphthalenesodium, or Lewis acids, such as $BF_3$, $AlCl_3$, $SnCl_4$ and $TiCl_4$, or metal complexes in the form of compounds of aluminium or titanium. The monomers can be polymerized in solution, suspension, emulsion or bulk.

If W is a hydroxyl, amino, mercapto, epoxide or carboxyl group or one of their reactive derivatives, the compounds of the formula III can be either polymerized or polycondensed or also grafted onto a polymeric backbone.

W here is particularly preferably OH, $NH_2$, COOH or a reactive derivative, in particular OH or a reactive derivative of the carboxyl group. The grafting reaction can be carried out by methods which are known per se, such as, for example, esterification, amidation, transesterification, transamidation, acetalization or etherification, and which are described in the literature [for example in standard works such as Houben-Weyl, Methoden der Org. Chemie (Methods of Organic Chemistry), Georg-Thieme-Verlag, Stuttgart or C. M. Paleos et al., J. Polym. Sci. Polym. Chem. 19 (1981), 1427].

A preferred grafting reaction comprises reaction of compounds of the formula III with organopolysiloxanes. For this, as described, for example, in EP-PS 0,060,335, linear or cyclic organohydridopolysiloxanes are reacted with ethylenically unsaturated compounds of the formula II in approximately equimolar amounts, based on the amount of siloxane hydrogen, in the presence of a catalyst which promotes the addition of silane hydrogen onto aliphatic multiple bonds.

All polymers in which the chains have a certain flexibility are in principle suitable as the polymeric backbone. These can be linear, branched or cyclic polymer chains. The degree of polymerization is usually at least 10, preferably 20-100.

However, oligomers, in particular cyclic oligomers, having 3 to 15, in particular 4 to 7, monomer units are also suitable.

Polymers with C—C main chains, in particular polyacrylates, -methacrylates, -α-halogenoacrylates, -α- cyanoacrylates, -acrylamides, -acrylonitriles or -methylene malonates, are preferably employed. Polymers with heteroatoms in the main chain, for example polyethers, -esters, -amides, -imides or -urethanes, or in particular polysiloxanes, are furthermore also preferred.

The polymer compositions according to the invention which contain liquid crystal phases preferably contain 20-100% of mesogenic groups having a structural element corresponding to the formula I. A content of 50-100% is particularly preferred.

The compounds of the formula III can be prepared by methods which are known per se, such as are described in the literature (for example in the standard works, such as Houben-Weyl, Methoden der Organischen Chemie (Methods of Organic Chemistry), Georg-Thieme-Verlag, Stuttgart), and in particular under reaction conditions which are known and suitable for the reactions mentioned. It is also possible for these reactions to utilize variants which are known per se and are not mentioned in more detail here.

Thus, compounds of the formula III having the reaction groups W can be obtained by a process in which, for example, in compounds which otherwise correspond to the formula III, an alkyl group is dehydrogenated to the vinyl group or a carboxyl group is reduced to the hydroxyl group or a nitrile is converted into the amino group. Epoxide groups are obtained by epoxidization of the corresponding cyclohexane derivatives by standard processes.

These preparation processes are known methods which are described in the literature (for example in standard works, such as Houben-Weyl, Methoden der Organischen Chemie (Methods of Organic Chemistry), Georg-Thieme-Verlag, Stuttgart) and in particular under-reaction conditions which are known and suitable for the reactions mentioned. It is also possible for these reactions to utilize variants which are known per se and are not mentioned in more detail here.

Compounds of the formula III with appropriate terminal functional groups and the corresponding monomers of formula II which, instead of the polymer have a functional group on the spacer, correspond to the formula II'

$$R^1-(A^1-Z)_n-A^2-Sp-W \qquad II'$$

wherein, $R^1$, $A^1$, Z, n, $A^2$, Sp and W have the meanings given, and can be prepared by methods which are known per se, such as are described in the literature (for example in the standard works, such as Houben-Weyl, Methoden der Organischen Chemie (Methods of Organic Chemistry), Georg-Thieme-Verlag, Stuttgart), and in particular under reaction conditions which are known and suitable for the reactions mentioned. It is possible to utilize for these reactions variants which are known per se and are not mentioned in more detail here.

The low molecular weight compounds of the formula II' or III in some cases have wide mesophase ranges. However, compounds of the formula II' or III which contain no mesophases are also suitable for the preparation of the polymer materials according to the invention.

Homo- or copolymers are preferably prepared from the compounds of the formula II' or III which are capable of polymerization or derivatives thereof which are capable of polymerization by free radical polymerization. The reaction is started, for example, by UV irradiation or agents which form free radicals. The monomers can be polymerized in solution or in bulk.

Copolymer materials according to the invention which contain liquid crystal phases are obtained by copolymerization of compounds of the formula III or II' which are capable of polymerization, or derivatives thereof which are capable of polymerization, with monomers which carry no mesogenic radicals, which carry other mesogenic radicals, which carry chiral radicals or which carry dyestuff radicals (DE-OS 32 11 400).

The copolymerization with such monomers starting from a monomer mixture with the concentration $X_1$ only leads to a copolymer with an incorporation ratio corresponding to the monomer concentration $X_1$ if the copolymerization parameters of the monomer components are of comparable order of size. This is of particular importance if a copolymer of certain composition is to be prepared without problems, for example without taking into account the reaction kinetics. Monomer components which have comparable copolymerization parameters, for example alkyl acrylates or methacrylates which primarily differ by the substituent of the alkyl chain, are therefore preferably chosen.

Copolymerization with monomers which carry no mesogenic radicals in general leads to a lowering of the glass transition temperature and the clear point. By suitable choice of the spacer, it is often possible to bring the mesophase range into the temperature range suitable for the particular intended use.

Monomers with a chiral radical which can be used are in principle all such compounds having asymmetric C atoms. The asymmetric C atom here can be either in the wing group, between two rings or in the spacer group of the mesogenic radical.

Finally, numerous other possible variations result because of the fact that the compounds according to the invention combine liquid crystal properties with typical polymer properties, such as the capacity for layer, film and fibre formation, easy thermoformability and the like. These properties can be modified in a manner which is known per se by copolymerization or mixing with other components, by varying the molecular weights, by additions of the most diverse inorganic or organic additives and metals, by crosslinking, for example to give an elastomer, and by many other treatments with which the polymer expert is familiar.

The polymer materials according to the invention can be used as the starting material for the production of organic glasses with anisotropic properties which can be modified within a wide range.

Such applications result, for example, in the sector of optical and solar collectors and in organic phototropic glasses. An important field of use is further more opened up in the field of optical memories.

Other possible applications are opened up in the field of magnetic memories. The materials according to the invention themselves are particularly suitable as materials with non-linear optical properties or as a matrix for substances with non-linear optical properties for the production of non-linear optical structural elements.

Polymers with $S_{c^*}$ phases are furthermore suitable as piezoelectric, pyroelectric or ferroelectric materials.

Without further elaboration, it is believed that one skilled in the art can, using the preceding description, utilize the present invention to its fullest extent. The following preferred specific embodiments are, therefore, to be construed as merely illustrative, and not limitative, of the remainder of the disclosure in any way whatsoever.

In the foregoing and in the following examples, all temperatures are set forth uncorrected in degrees Celsius and, unless otherwise indicated, all parts and percentages are by weight.

The entire texts of all applications, patents and publications, if any, cited above and below, and of corresponding application P 38 29 375.7 are hereby incorporated by reference.

C=crystalline state, S=smectic phase (the index designates the phase type), N=nematic state, Ch=cholesteric phase, I=isotropic phase. The number between two symbols indicates the transition temperature in degrees Celsius. Mp. is melting point and Cp. is clear point, $T_G$=glass state.

EXAMPLES

Example 1 a) A mixture of 0.127 mol (14 g) of hydroquinone and 90 ml of tetrahydrofuran is cooled to $-30°$. 0.063 mol (10.67 g) of 4-methyl-2-S(−)-chloropentanoyl chloride in 30 ml of THF are then added, followed by 0.063 mol (6.45 g) of triethylamine in 30 ml of THF. The solution is further stirred overnight at room temperature.

The precipitate is filtered off, the solvent is distilled off on a rotary evaporator, chloroform is added to the residue and the mixture is stirred and filtered again. The solvent is distilled off and the residue is purified by chromatography to give 4-hydroxy-4'-(4-methyl-2-S(−)-chloropentanoyloxy)benzene.

b) 0.033 mol (12 g) of 4-(11-(2-methyl)propenoyloxyundecyloxy)-α-cyanocinnamic acid (which can be prepared by azeotropic esterification of methacrylic acid and 4-(11-hydroxyundecyloxy)-α-cyanocinnamic acid, which is prepared from α-cyano-4-hydroxycinnamic acid and 11-bromodecanol by a process analogous to a Williams etherification) is reacted with 50 g of thionyl chloride to give the corresponding acid chloride.

c) 2 g ($8.24 \times 10^{-3}$ mol) of the substance obtained in a) and 4.76 g ($10.67 \times 10^{-3}$ mol) of the acid chloride from b) are esterified analogously to a).

Working up is carried out as follows: a few drops of water are first added and the mixture is stirred at room temperature for one hour in order to hydrolyse unreacted acid chloride.

The solvent is then evaporated and THF is added to the residue. The triethylamine hydrochloride which has precipitated is filtered off and the solvent is removed from the filtrate. Purification of the residue by chromatography gives 4'-(4-methyl-2-S(−)-chloropentanoyloxyphenyl 4-(11-(2-methyl)propenoyloxyundecyloxy)-α-cyanocinnamate of Mp. 77.9°.

Example 2

Analogously to Example 1 c), 4'-(1-octyloxyphenyl) 4-(11-(2-methyl)propenoyloxyundecyloxy)-α-cyanocinnamate of Mp. 109.7° is obtained from 4-octyloxyphenol and 4-(11-(2-methyl)-propenoyloxyundecyloxy)-α-cyanocinnamoyl chloride (for the preparation, see Example 1 b)).

Example 3

Analogously to Example 1 c), 4'-(4-methyl-2-S(−)-chloropentanoyloxy)-biphenyl 4-(11-(2-methyl)-propenoyloxyundecyloxy)-α-cyanocinnamate of Mp. 103.7° is obtained from 4-hydroxy-4'-(4-methyl-2-S(−)-chloropentanoyloxy)biphenyl (preparation analogous to 1 a) by reaction of 4-methyl-2-S(−)-chloropentanoyl chloride and 4,4'-dihydroxybiphenyl) and 4-(11-(2-methyl)propenoyloxyundecyloxy)-α-cyanocinnamoyl chloride (for the preparation, see Example 1 b)).

Example 4

1.4 mol % (based on the monomer) of azobisisobutyronitrile (AIBN) are added to a 0.35 molar solution of 4'-(4-methyl-2-S(−)-chloropentanoyloxphenyl 4-(11-(2-methyl)propenoyloxyundecyloxy)-α-cyanocinnamate in THF and the mixture is stirred at 60° under an argon atmosphere for 10 hours. The polymer is reprecipitated three times in cooled methanol and taken up in 30 ml of benzene. The solution is filtered, and after freeze-drying the corresponding polymer with the phase sequence $T_G$ 26° Sc* 56° $S_A$ 79° I is obtained.

Example 5

Analogously to Example 4, a polymer with the phase sequence $T_G$ 23° $S_c$ 60° $S_A$ 127° I is obtained from 4'-(1-octyloxyphenyl) 4-(11-(2-methyl)propenoyloxyundecyloxy)-α-cyanocinnamate.

Example 6

Analogously to Example 4, the corresponding polymer with the phase sequence $T_G$ 40° Sc* 107° $S_A$ 191° I is obtained from 4'-(4-methyl-2-S(−)-chloropentanoyloxy)biphenyl 4-(11-(2-methyl)-propenoyloxyundecyloxy)-α-cyanocinnamate.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. In a polymer having a liquid crystalline phase and comprising a polymeric backbone and pendant mesogenic groups bonded directly or via a spacer to said backbone, the improvement wherein at least one of the mesogenic groups contains a 2-cyanoacrylic acid ester structural element of the formula I

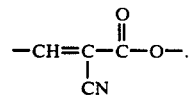

2. A polymer according to claim 1, wherein at least one mesogenic group is of the formula II

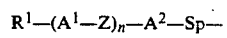

wherein
$R^1$ is H, halogen, CN, —NCS, or $C_{1-15}$-alkyl, wherein one or more $CH_2$ groups is optionally replaced by —CH=C—CN—CO—O—, —O—, —S—, —O—CO—O—, —CO—, —CO—O—, —O—CO—, —CRR'—T—, —CO—S—, —S—CO—, —CH=CH—(trans), —C(halogen)$_2$—, —SO— or —SO$_2$—, 2 heteroatoms not being linked with one another, $A^1$ and $A^2$ each independently of one another are
  a) 1,4-cyclohexylene, wherein a $CH_2$ group is optionally replaced by —CO—, and wherein one or two non-adjacent $CH_2$ groups are optionally replaced by —O— and/or —S— atoms,
  b) 1,4-phenylene, wherein one or more CH groups are optionally replaced by N, or
  c) 1,4-bicyclo(2.2.2.)octylene or piperidine-1,4-diyl,
    a) and b) optionally being monosubstituted or polysubstituted by halogen and/or CN and/or $CH_3$ and/or $NO_2$,
n is 1, 2 or 3,
z is —CH=CCN—CO—O—, —CO—O—, —O—CO—, —$CH_2CH_2$—, —CRR'—T—, —$CH_2$—CO—, —CO—$CH_2$—, —CHCN—$CH_2$—, —$CH_2$CHCN—, —CH=CH—, —$CH_2$—, —$CH_2$—O—, —C≡C—, —CH—$CNO_2$—, —$CHNO_2$ or a single bond,
Sp is a single bond or $C_{2-18}$-alkylene wherein one or two non-adjacent $CH_2$ groups are optionally replaced by —CH=CCN—CO—O—, —O—, —CO—, —O—CO—, —CO—O—, —C(-halogen)$_2$—, —CRR'—T—, —CH=$CNO_2$, —$CHNO_2$—, —CHCN— or —CH=CH—,
T is —COO—, —OCO— or a single bond,
R is H or an alkyl group having up to 6 C atoms and R' is halogen or CN.

3. A polymer according to claim 2, wherein the 2-cyanoacrylic acid ester structural element is present in the wing group $R^1$.

4. A polymer according to claim 2, wherein the 2-cyanoacrylic acid ester structural element is present in the bridge Z.

5. A polymer according to claim 2, wherein the 2-cyanoacrylic acid ester structural element is present in the spacer Sp.

6. In a thermochromic film comprising a cholesteric polymer, the improvement wherein the polymer is a polymer of claim 1.

7. In a polymer having ferroelectric, piezoelectric, pyroelectric and/or non-linear optical properties, the improvement wherein the polymer is a polymer of claim 1.

8. A polymer according to claim 1, wherein the backbone comprises vinyl groups.

* * * * *